May 6, 1969 M. L. McCORKLE 3,442,534
SAFETY HITCH
Filed Jan. 3, 1967 Sheet 1 of 2
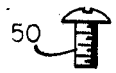
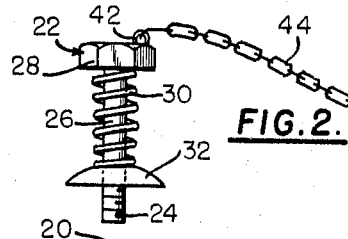
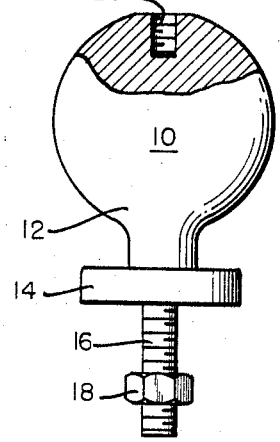
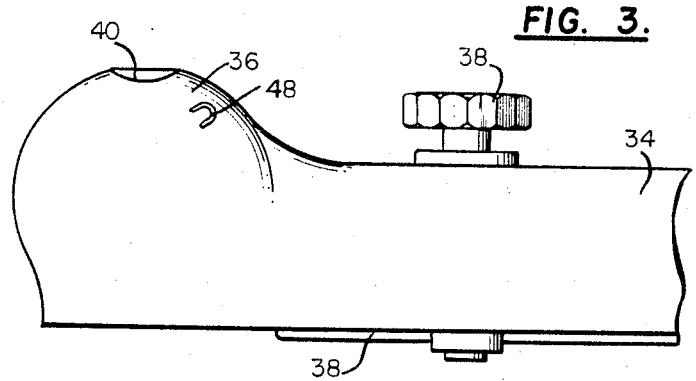
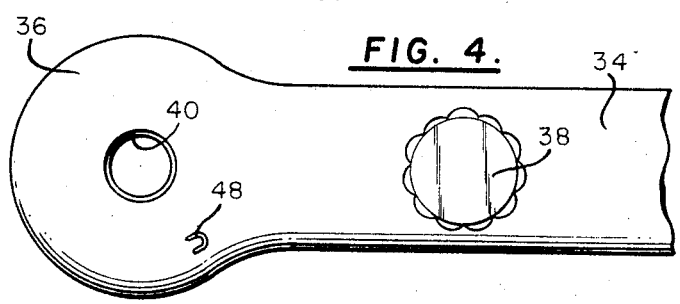
INVENTOR
Manley L. McCorkle
BY Charles F. Steininger
ATTORNEY

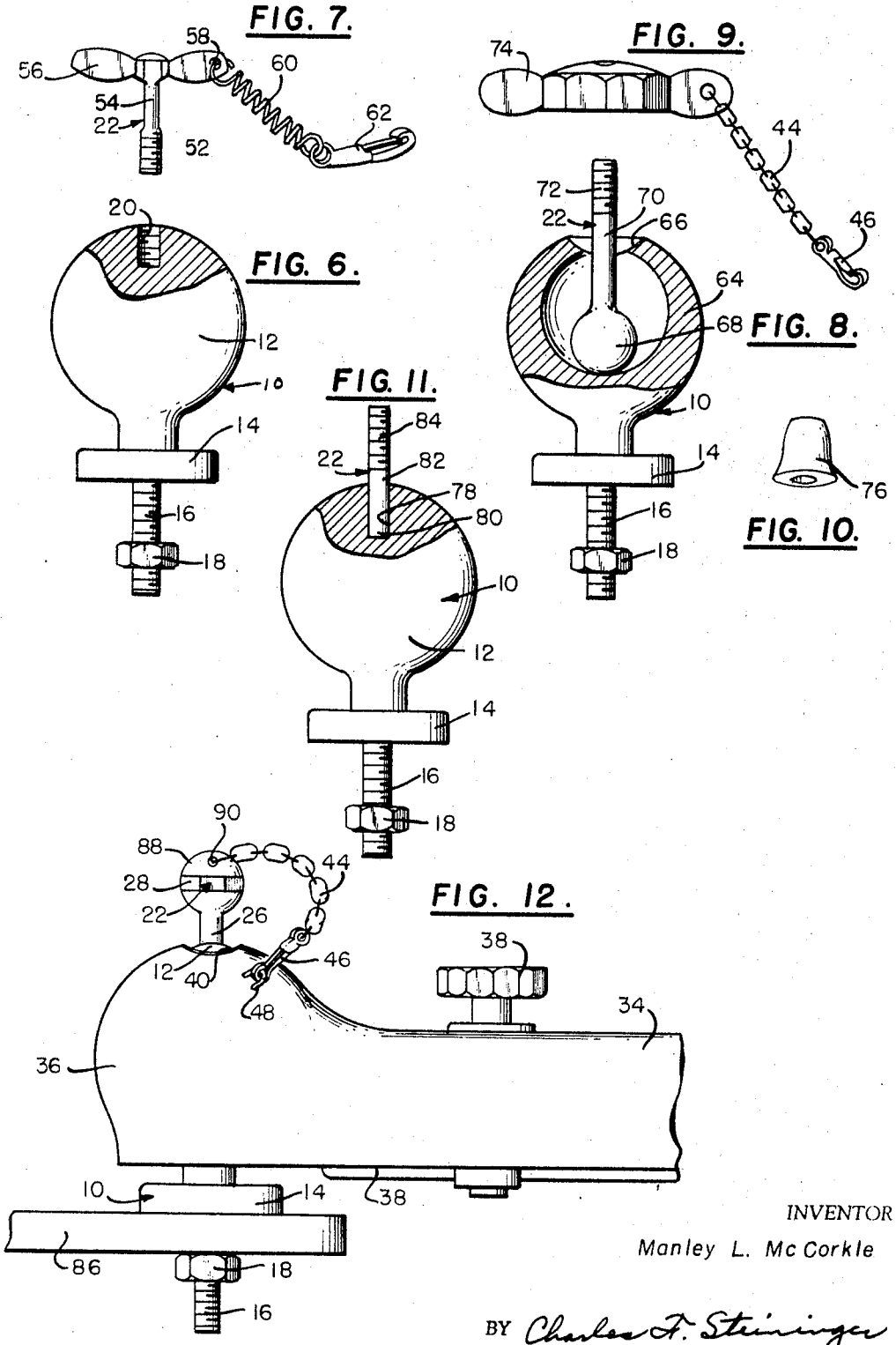

United States Patent Office 3,442,534
Patented May 6, 1969

3,442,534
SAFETY HITCH
Manley L. McCorkle, 1002 Gardenia Lane,
Longview, Tex. 75601
Filed Jan. 3, 1967, Ser. No. 606,744
Int. Cl. B60d 1/06
U.S. Cl. 280—511                24 Claims

ABSTRACT OF THE DISCLOSURE

A hitch for coupling a drawn vehicle to a draft vehicle; including, a ball having a stud and nut for attaching the ball to the draft vehicle; a socket on the tongue of the drawn vehicle and adapted to receive the ball; a main clamp adapted to releasably clamp the ball in the socket and prevent the ball from seperating from the socket when the coupling hitch is in use; a stud mounted in the top of the ball projecting upwardly from the top of the ball through an aperture in the socket; a limiting element, such as an enlarged head, a nut of the like, mounted on the upper end of the stud, larger in diameter than the stud and the aperture in the socket to thereby prevent accidental removal of the socket from the ball and at the same time permit sufficient vertical clearance for the socket to rotate through vertical planes about the ball. A limit spring or chain, attached to the releasably mounted one of the stud or the limiting element and to the socket means is also adapted to prevent the limit means from being accidentally removed by unscrewing or the like.

The present invention relates to a hitch for coupling a drawn vehicle to a draft vehicle. More specifically, the present invention relates to means for preventing a hitch for coupling a drawn vehicle to a draft vehicle from uncoupling in the event that the main clamping means fails.

Substantially all of the hitches available today for coupling a drawn vehicle to a draft vehicle include a ball mounted on the draft vehicle and a cooperating socket formed on or attached to the tongue of the drawn vehicle. For towing operations, the ball is inserted in the socket and a main clamping means or latch means is positioned in clamping arrangement about a portion of the bottom of the ball to hold the ball within the socket. It is a well known fact that because of the design of such clamping means, such clamping means can and do fail during towing, thereby making it necessary to have some type of auxiliary catch or safety means to prevent the drawn vehicle from running free of the draft vehicle until both can be safely stopped. The primary means for accomplishing this is the well known use of safety chains. These safety chains simply consist of a pair of chains attached to the tongue of the drawn vehicle and which are releasably coupled to the hitch on the draft vehicle or the draft vehicle itself. However, the very nature of such safety chains make these chains themselves almost as great a hazard as a free-running drawn vehicle. The primary problem with safety chains is that their flexibility and the length necessary to allow turning permit substantial relative movement between the draft vehicle and the drawn vehicle, thus permitting the drawn vehicle to run into or underneath the draft vehicle or, even more frequently, to cause a whiplashing of the drawn vehicle and the consequent sway of the drawn vehicle into the path of another vehicle or the overturn of the drawn vehicle. Accordingly, it is an object of theh present invention to provide a safety means for a hitch which is more readily attached than safety chains, is more simple and economic in structure than the majority of safety devices, and which avoids the problems of whiplashing, the drawn vehicle running into or under the draft vehicle, or the numerous other disadvantages of the present-day safety means for hitches.

Briefly, the safety means of the present invention includes a stud mounted in the ball of the hitch and projecting upwardly from the top of the ball, a limit means on the upper end of the stud and an aperture through the top of the socket of the hitch to receive the stud and cooperate with the stud to permit normal rotation of the ball within the socket during a towing operation.

The many advantages and the main character of the present invention will be apparent from the following detailed description when read in conjunction with the drawings wherein:

FIGURE 1 is a cross-sectional view of the ball of a hitch in accordance with the present invention;

FIGURE 2 is a view of a stud means for the ball of FIGURE 1;

FIGURE 3 is an elevational view partially in section of a socket of a hitch for use with the ball of FIGURE 1;

FIGURE 4 is a top view of a socket of FIGURE 3;

FIGURE 5 is an elevational view of a thread protector for the ball of FIGURE 1;

FIGURE 6 shows a ball similar to the ball of FIGURE 1;

FIGURE 7 shows a stud means differing from the previous stud, and insertable in the ball of FIGURE 6;

FIGURE 8 shows another form of the ball and stud means of a hitch, in accordance with the present invention;

FIGURE 9 shows a limit means for the stud means of FIGURE 8;

FIGURE 10 shows a cap for protecting the threads of the stud of FIGURE 8;

FIGURE 11 shows a ball and stud means of a hitch, in accordance with the present invention, adapted to receive the limit means of FIGURE 9 and the thread protector of FIGURE 10; and FIGURE 12 shows a ball in place in a socket of a hitch and a still another form of the stud means of the present invention.

Referring now to the drawings, the numeral 10 designates generally a ball means for attachment to a draft vehicle. The ball means comprises a ball 12, an intermediate flange 14 adapted to fit on top of a mounting bar (not shown) attached to the draft vehicle, a threaded lower portion 16 adapted to pass through a hole in the mounting bar, and a hexagonal nut 18 adapted to screw onto bolt portion 16 and clamp against the bottom of the mounting bar. In the upper part of ball 12 is a tapped and threaded aperture 20. Adapted to screw into the threaded aperture 20 is stud means 22 of the present invention as shown in FIGURE 2. The stud means of FIGURE 2 includes a lower threaded portion 24 adapted to screw into aperture 20, an intermediate non-threaded section 26, and an upper hexagonal head or limit means 28. Mounted about intermediate portion 26 of stud means 22 is a helical compression spring 30. Mounted below compression spring 30 is cap means 32. Spring 30 may be fixedly attached by welding or otherwise to limit means 28 and/or cap 32. FIGURES 3 and 4 show a tongue means of the drawn vehicle designated by the numeral 34. Formed on the free end of the tongue 34 is a socket means 36 which is adapted to receive ball 12 and permit ball 12 to rotate therein through any vertical plane of a full 360° circle of a horizontal plane. Socket 36 is held in a coupled position on ball 12 by means of the primary or main clamp means 38. Clamp means 38 is not shown in detail since there are a wide variety of such known clamping means. In any event, clamping means 38 is usually of the wedge type and manipulation of the clamping means pushes this wedge forward beneath a part of ball 12 and partially about the neck between the ball 12 and the flange 14 of the ball means. Socket means 36 has formed in its top an aperture 40. Aperture 40 is adapted to receive the bolt means 22 when the socket is in place on ball 12. In the embodiment of FIGURES 1 through 5, aperture 40 is sufficiently larger than the diameter of bolt means 22 to permit free movement of ball 12 through any vertical plane of a full 360° circle of a horizontal plane in addition to normal turning movement through a horizontal plane when a towing operation is underway. In other words, this permits the axis of the tongue to move relative to the axis of the ball as well as to rotate in a horizontal plane without interference by the stud means 22. The unthreaded intermediate portion 26 of bolt means 22 is preferably of a predetermined length such that it will permit a limited upward movement of socket 36 away from ball 12 if the main clamp means 38 should fail. This limited upper movement is necessary to a certain extent to prevent the ball from being torn off the draft vehicle if the main clamp suddenly lets loose. However, more than a predetermined limited movement, such for example as one-half inch for a 1⅞-inch ball, is not desirable since it would result in whiplashing and the other disadvantages of the chain-type safety devices. Welded to the top of limit nut 28 of stud means 22 is an eyelet 42. The eyelet 42 may be formed as part of nut 28 or nut 28 may simply have a hole drilled therethrough. In any event, attached through eyelet 42 is a chain or other coupling means which terminates at its free end in a spring clip 46. In addition, an eyelet 48 is also welded or otherwise formed on the tongue 34 or the socket 36, so that the clip 46 may be attached to eyelet 48 with chain 44 fully extended. The purpose of chain 44 is to prevent the stud means 22 from unscrewing from ball 12 due to vibration during towing. This, of course, provides a still further safety feature, which is necessary any time a bolt or other threaded fastening means is to be used on a vibrating vehicle but yet is to be readily removable. Accordingly, chain 44 could be an appropriate spring or other suitable device so long as it is adapted to hold the limit head 28 and prevent it from loosening and coming off the hitch. FIGURE 5 shows a slotted bolt 50 adapted to be inserted in threaded aperture 20 of ball 12 when the ball is not being used. Bolt 50 could, of course, be a hexagonal-headed bolt to be turned by a wrench or, as hereinafter pointed out, can be a hand-turned head.

FIGURES 6 and 7 show another version of a ball and stud means according to the present invention. In accordance with these figures, the bolt means 22 includes a lower threaded portion 52 and an intermediate non-threaded portion 54, which are the equivalent of threaded portion 24 and non-threaded, intermediate portion 26 of FIGURE 2. However, formed on the upper end of bolt means 22 is a hand-operable cross head 46, which acts as a limit means to prevent the socket from separating from the ball in the event of a failure of the main clamping means of the hitch. The stud means 22 of FIGURE 7 is of course adapted to be screwed by hand into threaded aperture 20 of ball 12 and functions in essentially the same way as the stud means 22 of FIGURE 2. Accordingly, stud means 22 of FIGURE 7 could include the spring and cap 30 and 32 of FIGURE 2. In addition, an aperture 48 is formed through one wing of hand cross 46. Mounted in or attached through aperture 48 is a helical spring 50 having a spring clamp 62 attached to the free end thereof. As previously mentioned, spring 50 acts as an auxiliary safety device to prevent unscrewing of bolt means 22.

FIGURES 8, 9 and 10 show still another form of the invention of the present application. In FIGURE 8, the ball means 10 includes a hollow ball portion 64. Formed through the top of hollow ball portion 64 is an aperture 66. Aperture 66 receives stud means 22. On the lower end of stud means 22 is a ball 68 which is slightly larger in diameter than the smallest diameter of aperture 66. Ball 68 is inserted in the cavity in ball 64 by simultaneously heating ball 64 and cooling ball 68. Once ball 68 has thus been inserted, it will not be removable under normal conditions of vibration or otherwise. Stud means 22 includes an intermediate non-threaded portion 70 and an upper threaded portion 72. FIGURE 9 shows a limit means or hand-operated cross nut 74 which is tapped and threaded to screw onto the upper end of bolt means 22 of FIGURE 8. Thus, in the operation of the device of FIGURES 8 and 9, the stud means 22 is free to move relative to the ball 10 thereby permitting ball 10 to rotate through any vertical plane of a full 360° circle of a horizontal plane. Consequently, the aperture 40 in socket 36 on the drawn vehicle can be substantially the same diameter as intermediate portion 70 of bolt means 22 of FIGURE 8, and the socket will have the same freedom of movement as bolt means 22 of FIGURE 8. Further since ball 68 is substantially smaller than the cavity in ball 64, the bolt means 22 of FIGURE 8 can move upwardly relative to ball 64 and thereby permit socket 36 a limited vertical movement relative to ball 64 until the ball 68 prevents further movement and, in cooperation with limit means 74, prevents complete uncoupling from occurring. FIGURE 10 shows a cap 76 adapted to screw over bolt means 22 to protect the threads of the bolt means when the ball is not coupled to the towed vehicle.

FIGURE 11 of the drawings shows still another variation of a solid ball means for use in the combination of the present invention. In accordance with FIGURE 11, the ball 12 is tapped to form an aperture 78. A non-threaded lower portion 80 of bolt means 22 is inserted in aperture 78 and fixedly attached by welding or otherwise within the ball 12. Stud means 22 includes an intermediate non-threaded portion 82 and an upper threaded portion 84. Upper threaded portion 84 is adapted to receive the limit means 74 of FIGURE 9 or the threaded protecting cap 76 of FIGURE 10. So far as the operation of the variation of FIGURE 11 is concerned, it is substantially the same as that of the ball and stud configurations of FIGURES 1 and 6 in that it requires a socket 36 having an aperture 40 substantially larger than the diameter of intermediate portion 82 of the bolt means 22.

FIGURE 12 shows a ball means 12 attached to a mounting bar or draw bar 86 attached to the draft vehicle. Socket 36 is in place over the ball 12 and the main clamp means 38 clamps and holds the ball 12 in position within the socket 36. Screwed into the ball 12 is a stud means 22 which is of the variety shown in FIGURES 2 and 7. However, bolt means 22 of FIGURE 12 is varied to the extent that it includes an upper extension or flange 88 with an aperture 90 therethrough to receive chain 44.

Having described the present invention by way of specific examples and with reference to specific illustrations, it is to be understood that other variations and modifications, not mentioned herein, will be apparent to one skilled in the art without departing from the present invention. Accordingly, the present invention is to be limited only by the appended claims.

I claim:
1. In a hitch for coupling a drawn vehicle to a draft vehicle, having a ball means mounted on said draft vehicle, a socket means on the tongue of said drawn vehicle and adapted to receive said ball means, and main clamp means adapted to releasably clamp said ball means in said socket means and prevent said ball means from separating from said socket means when said coupling hitch is in use, the improvement comprising additional means for preventing separation of said ball means from said socket means, including:
 (a) stud means mounted in said ball means and projecting upwardly from the top of said ball means;
 (b) said socket means having an aperture through the top thereof adapted to receive said stud means when said socket means is in towing position on said ball means; and

(c) limit means mounted on the upper end of said stud means larger in diameter than the diameter of said aperture in said socket means and adapted to prevent said socket means from separating from said ball means when the main clamp means is inactivated;

(d) said stud means and said aperture in said socket means cooperating to permit movement of said ball means through any vertical plane of a full 360° circle of a horizontal plane when said socket means and said ball means are coupled together and towing is in progress; and (e) at least one of said limit means and said stud means being releasably mounted on its supporting structure.

2. A hitch in accordance with claim 1 wherein the stud means is threadably mounted in said ball means.

3. A hitch in accordance with claim 1 wherein the aperture in said socket means is larger than the diameter of said stud means to permit the ball means to move relative to said socket means when towing is in progress.

4. A hitch in accordance with claim 3 wherein the stud means is a bolt threadably mounted in the ball means and the limit means is an enlarged gripping means on the upper end of said stud means.

5. A hitch in accordance with claim 4 wherein the gripping means is a hand grip means.

6. A hitch in accordance with claim 4 wherein the gripping means is a head, having at least two flat sides, adapted to be gripped by a wrench.

7. A hitch in accordance with claim 1 wherein the stud means, when mounted in the ball means, is adapted to protrude a predetermined distance above said ball means to permit limited vertical movement of said socket means relative to said ball means when the main clamp means is inactivated.

8. A hitch in accordance with claim 7 wherein a spring means is mounted between the limit means and the socket means.

9. A hitch in accordance with claim 8 wherein a cap means is mounted between the spring means and the socket means.

10. A hitch in accordance with claim 1 which additionally includes a flexible safety means attached to the limit means, adapted to be releasably coupled between the releasably mounted one of said stud means and said limit means and the socket means to prevent the releasably mounted one of said stud means and said limit means from separating from its supporting structure.

11. A hitch in accordance with claim 1 wherein the upper end of the stud means is threaded and the limit means is an enlarged gripping means threadably mounted on said upper end of said stud means.

12. A hitch in accordance with claim 11 wherein the gripping means is a hand grip means.

13. A hitch in accordance with claim 11 wherein the gripping means is a head, having at least two flat sides, adapted to be gripped by a wrench.

14. A hitch in accordance with claim 1 wherein the ball means is hollow in its center and has an aperture through its top smaller than the diameter of the limit means and the stud means has an enlarged ball on its lower end, larger than said aperture through said ball means, mounted within said hollow portion of said ball means.

15. A hitch in accordance with claim 14 wherein the upper end of the stud means is threaded and the limit means is threadably mounted on said upper end of said stud means.

16. A hitch in accordance with claim 14 wherein the ball on the end of the stud means is smaller than the hollow in the center of the ball means.

17. In a hitch for coupling a drawn vehicle to a draft vehicle, having a ball means mounted on said draft vehicle, a socket means on the tongue of said drawn vehicle and adapted to receive said ball means, and main clamp means adapted to releasably clamp said ball means in said socket means and prevent said ball means from separating from said socket means when said coupling hitch is in use, the improved ball means comprising:

(a) ball means, including, attaching means for attachment of said ball means to said draft vehicle;

(b) stud means mounted in said ball means projecting upwardly from the top of said ball means and adapted to pass through an aperture in said socket means; and (c) limit means mounted on the upper end of said stud means larger in diameter than the diameter of said stud means and said aperture in said socket means;

(d) at least one of said stud means and said limit means being releasably mounted on its supporting structure.

18. A ball means in accordance with claim 17 wherein the ball means is solid and the stud means is threadably mounted in said ball means.

19. A ball means in accordance with claim 17 wherein the upper end of the stud means is threaded and the limit means is threadably mounted on said threaded portion of said stud means.

20. A ball means in accordance with claim 19 wherein the ball means is solid and the lower end of the stud means is fixedly mounted in said solid ball.

21. A ball means in accordance with claim 19 wherein the ball means has a hollow interior and an aperture larger than the diameter of the stud means formed in its top, the stud means has a ball larger than the minimum diameter of said aperture formed on the lower end of said stud means and said ball on said stud means is positioned in said hollow interior of said ball means.

22. A ball means in accordance with claim 17 wherein a flexible holding means is attached to the limit means to prevent the limit means from accidentally separating from the ball means.

23. A ball means in accordance with claim 22 wherein the flexible holding means is a helical spring.

24. A ball means in accordance with claim 22 wherein the flexible holding means is a chain.

References Cited

UNITED STATES PATENTS

| | | | |
|---|---|---|---|
| 485,033 | 10/1892 | Hanna | 287—87 X |
| 2,893,644 | 7/1959 | Holden | 287—87 X |
| 2,940,786 | 6/1960 | Horning | 287—87 |
| 3,072,426 | 1/1963 | Gilbert | 287—87 X |
| 3,226,133 | 12/1965 | Geresy | 280—507 |
| 3,269,757 | 8/1966 | Maxeiner | 280—87 |

LEO FRIAGLIA, *Primary Examiner.*

J. E. SIEGEL, *Assistant Examiner.*